United States Patent [19]

Berlad

[11] Patent Number: 5,513,120
[45] Date of Patent: Apr. 30, 1996

[54] SPECIAL INTERPOLATION FILTERS

[75] Inventor: Gideon Berlad, Haifa, Israel

[73] Assignee: Elscint Ltd., Haifa, Israel

[21] Appl. No.: 390,276

[22] Filed: Feb. 15, 1995

Related U.S. Application Data

[63] Continuation of Ser. No. 5,800, Jan. 19, 1993, abandoned.

[51] Int. Cl.$^6$ .............................. G06F 17/17; G06F 7/38; G06F 15/00
[52] U.S. Cl. ................. 364/723; 364/413.18; 364/724.1
[58] Field of Search .......................... 364/724.01, 724.1, 364/723, 701, 413.24, 431.05, 413.13, 413.15, 413.17, 413.18, 413.19, 413.22; 358/11

[56] References Cited

U.S. PATENT DOCUMENTS 4,808,826  2/1989  Lim et al. ........................ 250/363.01
4,914,507  4/1990  Smith et al. ........................... 358/11
4,987,544  1/1991  Honda et al. ....................... 364/431.05

OTHER PUBLICATIONS

Ronald J. Jaszczak et al.(Variance Propagation for Spect With Energy—Weighted Acquisition IEEE Transaction on Nuclear Science vol. 38, No. 2, Apr. 1991.

*Primary Examiner*—Roy N. Envall, Jr.
*Assistant Examiner*—Chuong D. Neo
*Attorney, Agent, or Firm*—Greenblum & Bernstein

[57] ABSTRACT

An interpolation filter that enables interpolation without changing the values of the interpolated points coinciding with the sampled data points, the signal content of the original image, or the variance of the original image.

17 Claims, 4 Drawing Sheets

SPECIAL INTERPOLATION FILTERS

This application is a continuation of application Ser. No. 08/005,800, filed Jan. 19, 1993, now abandoned.

FIELD OF THE INVENTION

This invention is concerned with interpolation filters and more particularly with variance conserving interpolation filters that can be effectively used with diagnostic medical imaging processes and equipment as well as for digital signal processing.

BACKGROUND OF THE INVENTION

In the processes of imaging, and particularly in the processes and systems for imaging patients for diagnostic purposes, images are generated by sampling an N dimensional radiation field on a grid of discrete points. The radiation field could be the result of X-ray radiation, nuclear medicine radiation, magnetic resonance radiation, or ultrasound radiation.

The sampling results in initially acquired data which is then transformed by some means to image data. For example, if the imaging system is a tomographic system, then the transformation of the initially acquired data could be a back projection transformation.

Transformation often requires knowledge of image values between sampled grid points; i.e., interpolation. For example, when the transformation is accomplished by back-projecting, then projections of the image from acquired data points are used along with projections of the image from positions between the acquired data points. The projections of the image from positions between acquired data points are supplied using interpolation.

Different types of interpolation techniques may be used. The simplest type, for example, is when the interpolation is made between two neighboring points; then, the effect of each of the neighboring points on the interpolated value is weighted by, for example, both the data amplitude at each of the nearest neighbors and the proximity of the interpolated point to each of its nearest neighbors.

It is important when interpolating that the signal content of the original image be maintained in the interpolated image. Thus, the transformation of the original image into the transformed image must not adversely affect the signal content of the image.

Transformation by interpolation can act either as a low pass or smoothing filter or as a high pass or sharpening filter. This presents a particularly bothersome problem since the sum of all squared interpolation coefficients (the transformation of the "variance") is a location dependent factor. Accordingly, the effect of the low pass or high pass filtering varies over the image as a function of the location relative to the data used for the interpolation.

This variation in the variance as a function of location generates "local texture" artifacts and spectral changes. The local texture artifacts, as the name implies, causes the texture of the image to change as a function of location of the interpolation. The local texture artifact problem is highlighted in a recently published article appearing in the IEEE Transactions on Nulcear Science, Vol. 38, No. 2 (April, 1991) entitled "Variance Propogation for Spect with Energy-Weighted Acquisition" by Ronald J. Jaszczak et al.

To overcome the change in local texture caused by interpolation it would be advantageous to devise an interpolation for which the variance is conserved. This is, in which the interpolation acts neither as a high pass filter nor a low pass filter.

BRIEF DESCRIPTION OF THE INVENTION

Accordingly, it is an object of the present invention to provide interpolation wherein the interpolation system does not change:

1) the value of interpolated points coinciding with the sampled data points,
2) the signal content of the image, and
3) the variance of the original image.

A related object of the present invention is to provide an interpolated image wherein the texture of the image does not vary as a function of location. The interpolation promulgated herein to overcome the prior art problems is based on a particular type of interpolation known as "four-point interpolation"; i.e., interpolation that uses the nearest neighbor grid points and the next nearest neighbor grid points that are in a line with the grid location point requiring interpolated data.

In a preferred aspect of the present invention a four-point interpolation method which assures that the signal content and signal-to-noise ratio are substantially the same after the interpolation as they were before the interpolation is provided, said method comprises the steps of:

using interpolation coefficients having values such that the sum of the interpolation coefficients add up to unity, and using interpolation coefficients having values such that the sum of all squared interpolation coefficients add up to unity.

BRIEF DESCRIPTION OF THE DRAWINGS

The above named and other objects and features of the present invention will be better understood when considered in the light of the following description of a broad aspect of the invention made in conjunction with the accompanying drawings, wherein.

GENERAL DESCRIPTION

Figure 1:
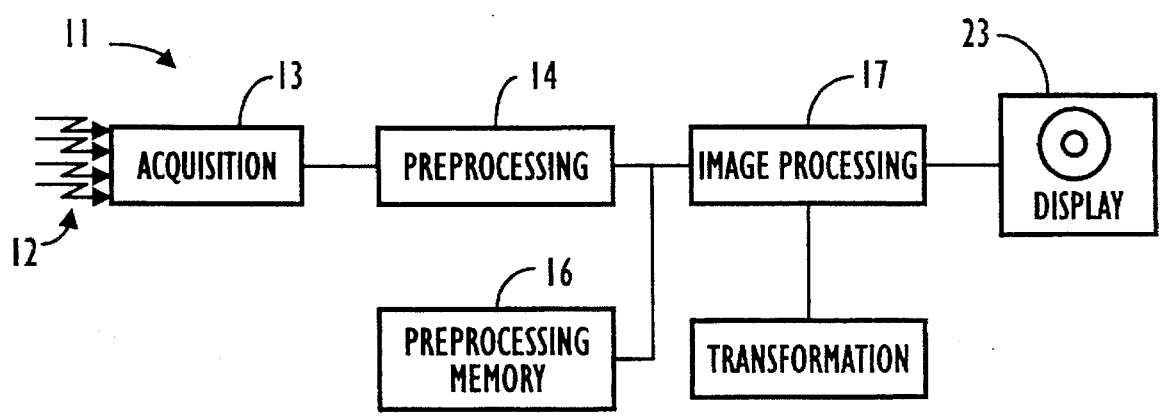
FIG. 1 is a generalized block diagram showing of a medical diagnostic imaging system.
Figure 2:
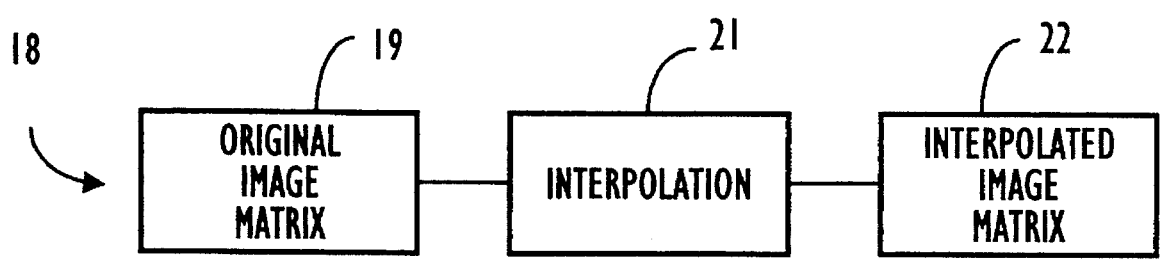
FIG. 2 is a block diagram showing of details of the transformation block shown in FIG. 1.

FIG. 1 is a block diagram showing of a generalized imaging system 11. The generalized imaging system has an acquisition block 13 which receives some type of energy usually in the form of radiation shown by the arrows 12. The acquisition block, typically could be a gamma camera head, for example, in which case the radiation 12 would be gamma rays. The signals from the acquisition block are preprocessed in preprocessor 14. The preprocessing, for example, comprises activities such as determining X,Y coordinates of an "event" if the acquisition equipment is a gamma camera. An "event" is defined herein as the impingement of radiation on a scintillator crystal. The preprocessing further includes such items as determining the energy level of the event and determining whether or not the energy level is sufficient to enable the preprocessor to continue the preprocessing.

A memory shown at 16 may be used with the preprocessing system. For example, the memory would be used to store linearity correction factors and the sensitivity correction factors in a gamma camera. The memory can also be used, for example, to store initial unfiltered unprocessed data during the processing procedure.

After preprocessing, the data from the preprocessor is then operated on by image processor 17. The image processor 17 which is shown linked with transformation equipment 18 accomplishes such things as back-projecting, reprojecting, Fourier transformations, zooming, or sub-pixel image shifting. The transformation equipment includes interpolation systems required during the image processing. For example, if an original or normal image is being zoomed then the original image shown at 19 is operated on by the interpolation means shown at 21 to provide an interpolated image 22. The processed, transformed image is then displayed on display unit 23.

The interpolated image could be a zoomed image, for example. Alternatively, the untransformed original image could be a fan beam sinogram image and the interpolation could be used to transform the fan beam data to a parallel ray sinogram data. Regardless of what the transformation is, where interpolation is used there is room for the accomplishments of the inventive interpolation system described herein.

In addition, to conserve the image content, it is preferred that the interpolation neither smoothes nor enhances the image being transformed by the interpolation system.

More particularly, it is desired that the interpolated values at points coinciding with the sampled grid points that are used for obtaining the interpolated points are conserved; i.e., they are not varied by the interpolation process. In addition, as previously mentioned, it is desired that the signal content of the image in its entirety be conserved.

Figure 3:
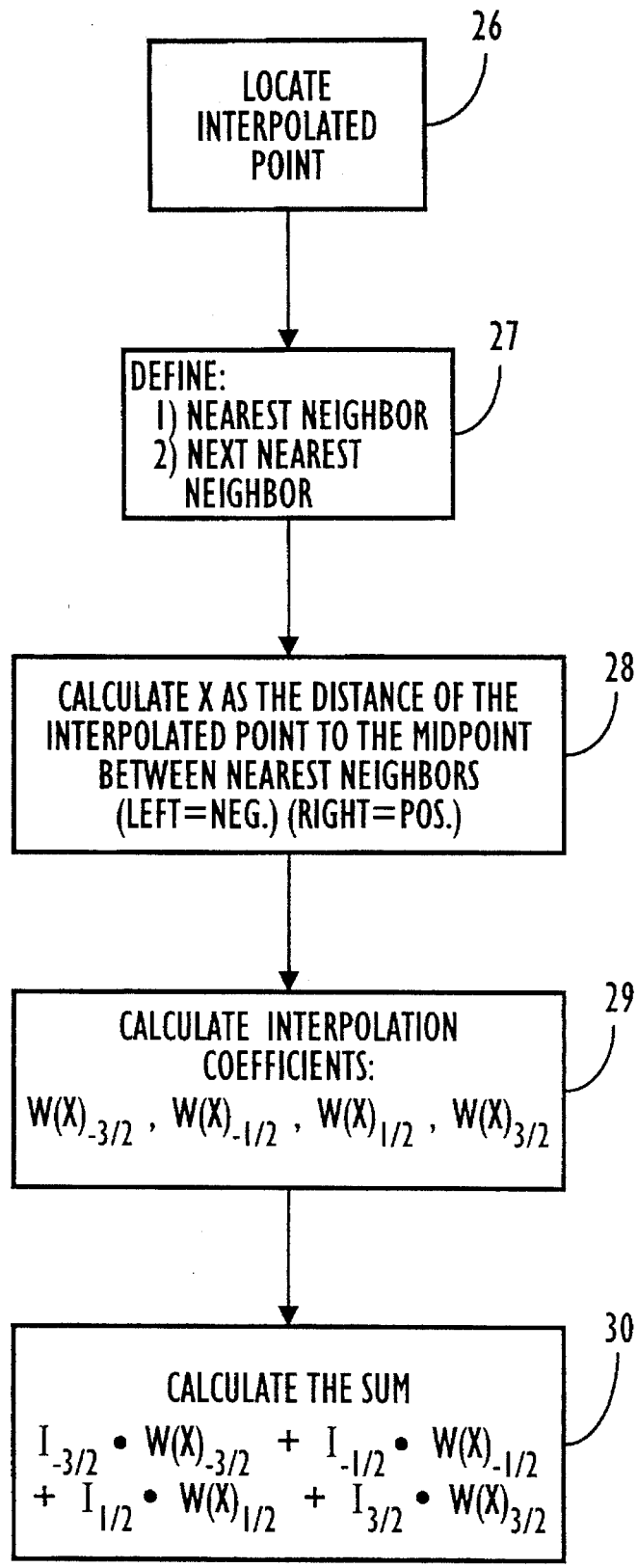
FIG. 3 is a flow chart showing of details of the interpolation.

Interpolation that accomplishes these goals is depicted particularly in flow diagram form in FIG. 3.

Figure 4:
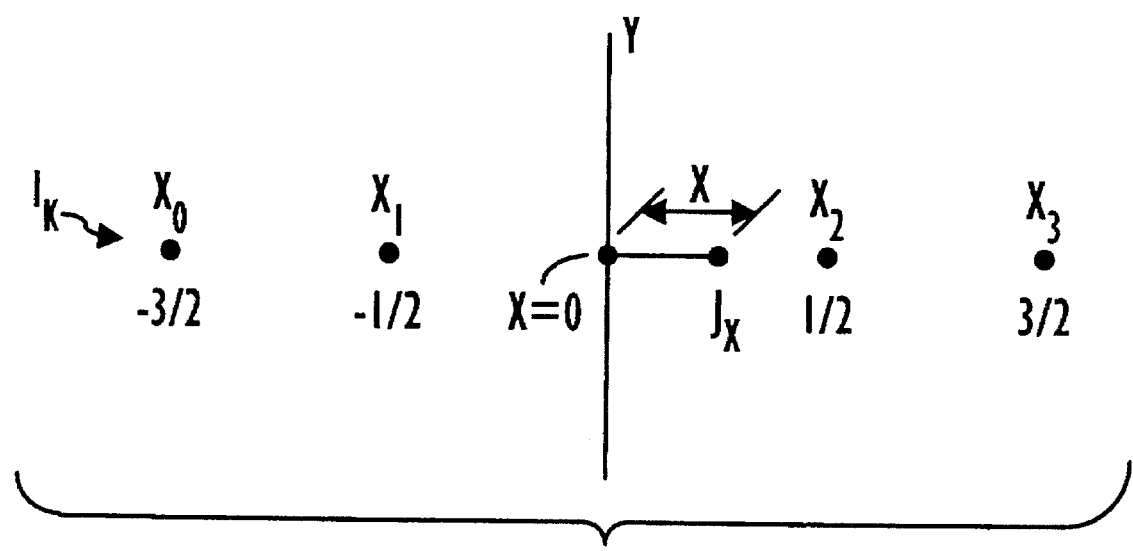
FIG. 4 shows the location of sampled values and an interpolated value determinable using the invention described herein.

However, prior to an explanation of FIG. 3, a generalized showing of a four-point linear interpolation is demonstrated with the four aligned measured points $X_0$, $X_1$, $X_2$ and $X_3$ shown in FIG. 4. The four points are the acquired or measured points $I_k$. The points $X_0$, $X_1$, $X_2$ and $X_3$ are shown as symmetrical about the Y axis, being located at distances of $-3/2$, $-1/2$, $+1/2$ and $+3/2$, respectively. The values and locations of the four $I_k$ points are used to determine the interpolated image point indicated at $J_x$.

The interpolated image point $J_{(x)}$ for $k \leq x < (k+1)$ is:

$$J_{(x)} = \sum_m \omega_m(X-k) \cdot I_{k+m} \text{ where } m = 0, 1, 2 \ldots \quad (1)$$

The interpolation coefficients omega$_m$ are normalized such that the sum of all coefficients adds up to one:

$$S(x) = \sum_m \omega_m(X) = 1 \quad (2)$$

Based on the random field origin of the digital image, the variance of the interpolated image is:

$$\sigma^2(x) = \sum_m \left( \frac{\partial(x)}{\partial I_{k+m}} \right)^2 \sigma^2_{k+m} = \sum_m \{\omega_m(x-k)\}^2 \sigma^2_{k+m} \quad (3)$$

Note the similarity between the transformation of the signal and the variance; i.e., $\omega_m(X-k)$ is replaced by $\{\omega_m(X-k)\}^2$.

The value by interpolation of an image point is obtained in a preferred embodiment using polonomial interpolation where a polonomial of the order N is passed through N+1 image points and is eventually used to compute the interpolated values. The most general polonomial interpolation is given by the Lagrange polynomial:

$$J_n(X) = \sum_{k=0}^{n} I(X_k) \prod_{\substack{l=0 \\ (l \neq k)}}^{n} \frac{(X-X_l)}{(X_k-X_l)} \quad (4)$$

where:

$I(X_k)$ are the sampled values at points $X_k$;

X is the location of the desired interpolated point (as in FIG. 4);

$J_n(X)$ is an interpolated value;

$l,k = 0,1,2, \ldots$ n denote the point number of the sample values.

An example of interpolated point J(x) obtained by interpolation is shown in FIG. 4. In FIG. 4, the four measured values extend from $-3/2$ to $+3/2$.

It can be shown from equation (4) above that the sum of all interpolation coefficients for any X adds up to 1. The fulfilment of this condition; i.e., the normalization of the coefficients ensures that the signal content of the original image remains unchanged in the interpolated image.

Based on the variance of the interpolated image as given by equation (3) above; the sum of all squared interpolation coefficients is designated as V(X):

That is:

$$V(X) = \sum_m \{\omega_m(X)\}^2 \quad (5)$$

When V(X) is less than 1, then the transformation acts as a low pass or smoothing filter. When V(X) is greater than 1 then the interpolation process acts as a high pass or enhancing filter.

This characteristic emphasizes the problem; since, V(X) is location dependent; it varies considerably from one X to another. Due to the variations in V(X), local texture artifacts and spectral changes are introduced. If V(X) is set equal to 1 local texture artifacts are minimized.

To provide an interpolation process such that the interpolation neither acts as a smoothing nor as an enhancing filter, the sum of the square of all of the coefficients are set to add up to unity.

Thus, for the example of FIG. 4, the four interpolation coefficients as derived from a four point cubic Lagrange polynomial would generally be:

$$J^c(X) = \Sigma \omega^c(X) \cdot I_k \qquad -1/2 \leq X \leq 1/2 \quad (6)$$
$$k = -3/2, -1/2, 1/2, 3/2;$$

or specifically, in the example of FIG. 4:

$$\begin{aligned}
\omega^c_{-3/2}(X) &= (-1/6) \quad \{(1/4) - X^2\} \quad \{(3/2) - X\} \\
\omega^c_{-1/2}(X) &= (1/2) \quad \{(9/4) - X^2\} \quad \{(1/2) - X\} \\
\omega^c_{1/2}(X) &= (1/2) \quad \{(9/4) - X^2\} \quad \{(1/2) + X\} \\
\omega^c_{3/2}(X) &= (-1/6) \quad \{(1/4) - X^2\} \quad \{(3/2) + X\}
\end{aligned} \quad (7)$$

The sum of the interpolation coefficients, $S^c(X)$, in the above equations (7) is equal to 1 in accordance with equation (2). Therefore, the signal values in the interpolated image are the same as the signal values in the uninterpolated image.

It can also be shown that the variance using the cubic four point interpolation is generally suppressed; i.e.:

$$V^c(X) = 1 - (1/9)\{(1/4) - X^2\}\{(9/4) - X^2\}\{(23/4) - 5X^2\}$$

However, the suppression of the variance is not uniform since it is X dependent as can be seen from the above equations, accordingly ($41/64 \leq V^c(X) \leq 1$). Therefore, for a location independent suppression of the variance, it is necessary to modify the coefficients by adding an additional term to each coefficient of equation (7).

Thus, the four coefficients $\omega^c(X)$ shown above are varied so that they are variance conserving coefficients; i.e., as shown in the following general equation:

$$J_{3/2}(X) = \Sigma \omega_k(X) \cdot I_k \qquad -1/2 \leq x \leq 1/2 \qquad (8)$$
$$k = -3/2, -1/2, 1/2, 3/2;$$

Or specifically, in the example of FIG. 4:

$$\begin{aligned}
\omega_{-3/2}(X) &= \omega^c_{-3/2}(X) - \{(1/4) - X^2\}\ \{(9/4) - X^2\}\ \beta(X^2) \\
\omega_{-1/2}(X) &= \omega^c_{-1/2}(X) + \{(1/4) - X^2\}\ \{(9/4) - X^2\}\ \beta(X^2) \\
\omega_{1/2}(X) &= \omega^c_{1/2}(X) + \{(1/4) - X^2\}\ \{(9/4) - X^2\}\ \beta(X^2) \\
\omega_{3/2}(X) &= \omega^c_{3/2}(X) - \{(1/4) - X^2\}\ \{(9/4) - X^2\}\ \beta(X^2)
\end{aligned} \qquad (9)$$

In the above equation (9) for the four coefficients, the only unknown is $\beta(X^2)$. The sum of the coefficients squared is set to 1. Then it is possible to solve for the added term for each cubic coefficient.

Setting $$\Sigma \{\omega_k(X)\}^2$$
$$k = -3/2, -1/2, 1/2, 3/2$$

and substituting the expressions for $\omega_k(X)$ from equation (9) it can be show, after some algebra, that $\beta(X^2)$ is given by $$\beta(X^2) = \frac{(23 - 20X^2)/9}{5 - 4X^2 + \{(5 - 4X^2)^2 + (1 - 4X^2)(1 - 9X^2)(23 - 20X^2)/9\}^{1/2}} \qquad (10)$$

$\beta(X^2)$ turns out to be a mildly X dependent function changing from $\beta = 0.214$ at $X=0$ to $\beta = 0.25$ at $X = \pm 1/2$.

FIG. 3 indicates in flow diagram form the derivation of the interpolated value $J_k(X)$ from the measured values $I_k$ at $X = X_k$. In block 26, the interpolated point is located between measured points along a line in an orthogonal grid system, for example. In block 27, the nearest neighbors and the next nearest neighbors, as shown in FIG. 4, are defined. The distance of the interpolated point to the midpoint between the nearest neighbors is calculated in block 28. This midpoint for purposes of the interpolations is $X=0$. The distance X enables calculation of the interpolation coefficients of the nearest neighbors and next nearest neighbors; i.e., for $X_k = -3/2, -1/2, 1/2, 3/2$ in block 29. The sum of the measured values $I_k$ at $-3/2, -1/2, 1/2$ and $3/2$ multiplied by interpolation coefficients at these nearest and next nearest neighbor location in block 30 provides the interpolated value $J(X)$ such that data variance is conserved by the cubic interpolation.

The output $J(X)$ as determined herein assures that the coefficient values at the grid points are conserved, the signal values of the uninterpolated image are conserved throughout the image and the variance is conserved. This results in the virtual removal of the texture artifacts.

It is possible to approximately conserve image variance with fewer computations using two alternative approximations. The two alternative methods each use some fixed $\beta$ rather than calculating the full X dependent $\beta$ function. The use of a fixed $\beta$ is possible because of the mild X-dependence of $\beta(X^2)$. Accordingly, using fixed $\beta$ solutions is feasible to approximately conserve variance within approximately $\pm 1\%$.

A first approximating method is based on the fact that the maximum of deviation of $V^c(X)$ from 1 happens at $X=0$ where its value is 41/64 or approximately 0.64.

Thus, if the summation of the square of the coefficients is set to equal 1 at $X=0$ the value of $\beta$ is then $(4\sqrt{3} - 5)/9$ or approximately 0.214. Substituting this value into the previous equations, it can be shown that $0.987 < V(X) \leq 1$. This provides conservation of the variance within about 1%.

Another approximate solution requires setting $\beta$ such that variance is conserved on an average; i.e., taking the average of the variance between $-1/2$ and $+1/2$; i.e., $$\int_{-1/2}^{1/2} dX \cdot V(X) = 1.$$

This results in the following value for $\beta$:

$$\beta = [(555/824)^2 + (106/309)]^{1/2} - 555/824 \text{ or approximately } 0.219$$

and consequently it is seen that $$0.9930 \leq V(x) \leq 1.0094$$

Thus, instead of the calculations being done with the full expression for $\beta$, approximate values of $\beta$ can be used in the interpolation.

The novel interpolation method can be extended to 2 to 3 dimensions to interpolate pixel or voxel data. Such data are usually sampled on a Cartesian or cylindrical grid. Each image dimension represents an independent (orthogonal) degree of freedom and consequently, the multi-dimensional interpolation functions turn out to be direct products of the one-dimensional interpolation functions. (It should be noted that the four point interpolation on a line turns into a 16-point interpolation on a square and a 64-point interpolation on a cube and, in general, to a $4^d$-point interpolation on a d-dimensional grid). For example:

$$(M) \begin{cases} J(X_1, X_2, \ldots) = \\ \Sigma_{m_1, m_2} \ldots \Sigma \ldots \omega_{m_1, m_2, \ldots}(X_1 - k_1, X_2 - k_2, \ldots) \\ I_{k_1 + m_1, k_2 + m_2} \ldots \\ \omega_{m_1, m_2} \ldots (X_1, X_2, \ldots) = \omega_{m_1}(X_1) \cdot \omega_{m_2}(X_1) \ldots \end{cases} \qquad (11)$$

Consequently, it follows that signal and variance conservation carries over from 1 dimension to 2, 3 . . . dimensions. In fact, the factorable structure of the interpolation function results in:

$$S(X_1, X_2 \ldots) = S(X_1)S(X_2) \ldots$$

$$V(X_1, X_2, \ldots) = V(X_1)V(X_2) \ldots$$

Therefore, if the 1-dimensional quantity equals 1, so does the d-dimensional quantity.

Accordingly, a method is provided wherein interpolation can be done which neither smoothes nor sharpens the image and which conserves the signal content of the original image.

While the invention has been explained using exemplary aspects of the invention, it should be understood that these aspects are used for purposes of explanation only and not as limitations on the scope of the invention.

What is claimed is:

1. A method of providing images of internal views of a patient for medical diagnostic purposes by sampling a radiation field emanating from said patient, said method comprising the steps of:

providing an orthogonal grid of discrete points to define the location of sampling points and non-sampling points in the radiation field, sampling the radiation field to acquire initial sampled data at said sampling points which are at certain of said discrete points on said orthogonal grid with other of said discrete points being said non-sampling points where initially no sampled data is acquired, transforming said initial sampled data to image data, said transforming step including interpolating said initial sampled data at said certain of said sampling points to obtain interpolated data at certain of said non-sampling points, said interpolating step comprising doing four point interpolation using the acquired initial sampled data at said sampling points that are nearest neighbors and next nearest neighbors in a line with, and on both sides of the non-sampling point requiring interpolated data, deriving interpolation coefficients for each of the four sampling points, maintaining the signal content of initial sampled data by conserving variance in a location independent manner and by varying the interpolation coefficients so that the sum of the squared varied interpolation coefficients adds up to unity to provide images with reduced local texture artifacts, and using the provided images for medical diagnostic purposes.

2. The method of claim 1 wherein the interpolating step includes the steps of:

determining a location of one of said non-sampling points, locating on said orthogonal grid the nearest two sampling points on a straight line to the determined location of the one of said non-sampling points, locating on said orthogonal grid the next nearest two sampling points to the determined location, there being a midway point that is midway between the two nearest sampling points on the straight line, the midway point being a zero point, determining the distance of the determined location to the midway point, calculating location dependent variance conserving interpolation coefficients of the nearest two sampling points and the next nearest two sampling points on each side of said determined location using a cubic polynomial, varying the location dependent variance conserving interpolation coefficients to obtain location independent variance conserving interpolation coefficients which provide interpolated values for said determined location such that changes in the texture of the provided image as a function of location are reduced, multiplying the location independent interpolation coefficients at the two sampling points nearest to the determined location and at the two sampling points next nearest to the determined location by the initial data at each of the nearest two sampling points and each of the next nearest two sampling points, respectively, to provide interpolation products, summing the interpolation products to provide interpolated data, and using the interpolated data with the initial data to provide the images with reduced local texture artifacts.

3. The method of claim 2 wherein the step of varying said location dependent variance conserving interpolation coefficients which conserve the variance of the original image, includes:

obtaining said location independent variance conserving interpolation coefficients at each of the four sampling points which are on the straight line by selectively adding products to and subtracting products from the location dependent variance conserving interpolation coefficients to conserve the variance in a location independent manner, said products comprised of a known function of the distance of the non-sampling point from the midway point multiplied by a multiplier that is a function of the distance of the non-sampling point from the midway point such that the variance is conserved in a substantially location independent manner.

4. The method of claim 2 wherein the interpolating step includes the steps of:

obtaining said location dependent variance conserving interpolation coefficients that suppress variance using a cubic polynomial, converting the location dependent variance conserving interpolation coefficients into location independent variance conserving interpolation coefficients by adding and subtracting products to the location dependent variance conserving interpolation coefficients, so that when the nearest two sampling points are at a distance to the midway point of $-1/2, 1/2$ and the next nearest two sampling points are at a distance to the midway point of $-3/2, 3/2$ the variance conserving interpolation coefficients are equal to:

$$\omega_{-3/2}(X) = \omega^c_{-3/2}(X) - \{(1/4) - X^2\} \{(9/4) - X^2\} \beta(X^2)$$

$$\omega_{-1/2}(X) = \omega^c_{-1/2}(X) + \{(1/4) - X^2\} \{(9/4) - X^2\} \beta(X^2)$$

$$\omega_{1/2}(X) = \omega^c_{1/2}(X) + \{(1/4) - X^2\} \{(9/4) - X^2\} \beta(X^2)$$

$$\omega_{3/2}(X) = \omega^c_{3/2}(X) - \{(1/4) - X^2\} \{(9/4) - X^2\} \beta(X^2)$$

where:

$W^c(X)$ are the location dependent variance conserving interpolation coefficients derived from a four point cubic polynomial, X is the distance of the desired non-sampling point from the midway point;

$W(X)$ are the location independent variance conserving interpolation coefficients; and $\beta(X^2)$ is an unknown function of X used to set the sum of the squared interpolation coefficients to 1.

5. The method of claim 4 wherein the interpolating step includes squaring coefficients $W(X)$, summing the squared coefficients $W^2(X)$, setting the sum equal to unity, solving for $\beta(X^2)$ with the sum of the squared interpolation coefficients equal to unity, and using the value of $\beta(X^2)$ at each X location to solve for a location dependent coefficient $W(X)$ that will result in variance being conserved.

6. The method of claim 5 wherein the solution of $\beta(X^2)$ is approximated.

7. The method of claim 6 wherein $\beta(X^2)$ is approximately 0.214.

8. The method of claim 6 wherein $\beta(X^2)$ is approximately 0.219 and consequently the sum of the squared coefficients is between 0.9930 and 1.0094.

9. The method of claim 1 wherein a $4^d$ point interpolation is accomplished on a d-dimensional orthogonal grid, where d is a positive integer equal to or greater than 1.

10. A system for providing images of internal views of a patient for medical diagnostic purposes, said system comprising:

an orthogonal grid of discrete points, a radiation detector for sampling a radiation field emanating from said patient on said orthogonal grid of discrete points to acquire initial sampled data at certain of said discrete points with other of said discrete points being non-sampling points where initially no sampled data is acquired, an image processor for transforming said initial sampled data to image data, said image processor including a four point interpolator for interpolating said initial data at said certain of said sampling points to obtain interpolated data at certain of said non-sampling points, said interpolator using normalized interpolation coefficients to obtain interpolated data, setting values of said interpolation coefficients so that the normalized interpolation coefficients add up to unity and so that the sum of squared interpolation coefficients add up to unity, said interpolator including:

means for locating a non-sampling point requiring interpolated data, means for locating the nearest two sampling points to the non-sampling point requiring interpolated data, said nearest two sampling points and said non-sampling point being on a straight line in said orthogonal grid, one of said nearest two sampling points being on each side of said non-sampling point requiring said interpolated data;

means for locating the next nearest two sampling points on the straight line, one point of each of said next nearest two sampling points being on each side of the non-sampling point requiring said interpolated data;

means for determining the distance of the non-sampling point requiring said interpolated data to a midway point between the nearest two sampling points, the midway point being a zero point in relation to the other five points; and means for setting the values of the interpolation coefficients used in the interpolations so that the sum of all squared interpolation coefficients adds up to unity to conserve the variance in a location dependent manner.

11. The system of claim 10 wherein said interpolator includes:

means for obtaining variance conserving interpolation coefficients at the nearest and the next nearest points to the non-sampling point such that the variance conserving interpolation coefficient conserve the variance in a location dependent manner;

means for varying the variance conserving interpolation coefficients by selectively adding products thereto and subtracting products therefrom to provide location independent interpolation coefficients that conserve the variance in a substantially location independent manner;

said products comprising a known function of the distance of the non-sampling point from the midway point multiplied by an unknown function of the distance of the non-sampling point to the midway point; and means for solving for the unknown function using the distance of the non-sampling point to the midway point, and means for using the solution of the unknown function to obtain interpolation coefficients to conserve variance in a substantially location independent manner.

12. The system of claim 11 wherein said interpolator includes:

means for obtaining the variance conserving interpolation coefficients that conserve variance by solving a cubic polynomial, said variance conserving interpolation coefficients being location dependent, means for converting the location dependent variance conserving interpolation coefficients into location independent variance conserving interpolation coefficients by selectively adding and subtracting values to the location dependent variance conserving interpolation coefficients so that when the nearest two sampling points are at a distance to the midway point of $-1/2, 1/2$ and the next nearest two sampling points are at a distance to the midway point of $-3/2, 3/2$ the location independent variance conserving interpolation coefficients are equal to:

$$\omega_{-3/2}(X) = \omega^c_{-3/2}(X) - \{(1/4) - X^2\} \{(9/4) - X^2\} \beta(X^2)$$

$$\omega_{-1/2}(X) = \omega^c_{-1/2}(X) + \{(1/4) - X^2\} \{(9/4) - X^2\} \beta(X^2)$$

$$\omega_{1/2}(X) = \omega^c_{1/2}(X) + \{(1/4) - X^2\} \{(9/4) - X^2\} \beta(X^2)$$

$$\omega_{3/2}(X) = \omega^c_{3/2}(X) - \{(1/4) - X^2\} \{(9/4) - X^2\} \beta(X^2)$$

where:

$W^c(X)$ are the location dependent variance conserving interpolation coefficients derived from a four point polynomial;

X is the location of the desired non-sampling point on an orthogonal on said orthogonal grid;

W(X) are the location dependent variance conserving interpolation coefficients; and $\beta(X^2)$ is an unknown multiplier that is a function of X used to set the sum of the squared variance location independent interpolation coefficients to 1.

13. The system of claim 12 wherein said interpolator includes:

means for summing the coefficients W(X), means for squaring the coefficients W(X), means for summing the squared coefficients, means for solving for $\beta(X^2)$ with the sum of the squared coefficients equal to one, and means for using the value of $\beta(X^2)$ at each X location to solve for a location independent coefficient W(X) that will result in variance being conserved.

14. The system of claim 13 wherein the solution of $\beta(X^2)$ is approximated.

15. The system of claim 14 wherein $\beta(X^2)$ is approximately 0.214.

16. The system of claim 14 wherein $\beta(X^2)$ is approximately 0.219.

17. The system of claim 10 wherein a 4d point interpolation is accomplished on a d-dimensional grid with d being a positive integer equal to or greater then 1.

* * * * *